United States Patent

Yokokawa et al.

[11] Patent Number: 5,977,722
[45] Date of Patent: Nov. 2, 1999

[54] DEVICE FOR APPLYING PARTICULAR VOLTAGE WAVEFORM FOR OPERATING A DISCHARGE LAMP

[75] Inventors: Yoshihisa Yokokawa; Tatuhiro Hiraoka, both of Himeji; Masaki Inoue, Takasago; Masaki Yoshioka; Tatushi Igarashi, both of Himeji, all of Japan

[73] Assignee: Ushiodenki Kabushiki Kaisha, Tokyo, Japan

[21] Appl. No.: 08/913,111

[22] PCT Filed: Jan. 13, 1997

[86] PCT No.: PCT/JP97/00044

§ 371 Date: Nov. 17, 1997

§ 102(e) Date: Nov. 17, 1997

[87] PCT Pub. No.: WO97/26779

PCT Pub. Date: Jul. 24, 1997

[30] Foreign Application Priority Data

Jan. 16, 1996 [JP] Japan .................................. 8-004499

[51] Int. Cl.[6] .................................................. H05B 41/14
[52] U.S. Cl. ........................... 315/207; 315/291; 315/219; 315/246
[58] Field of Search .................................. 313/550, 551, 313/491, 486, 493, 489, 483; 315/58, 207, 246, 248, 219, 326, 291, 358

[56] References Cited

U.S. PATENT DOCUMENTS 5,034,661  7/1991 Sakurai et al. .......................... 315/326
5,072,155 12/1991 Sakurai et al. .......................... 315/219
5,173,642 12/1992 Matsumoto et al. .................... 315/291
5,604,410  2/1997 Vollkommer et al. ................... 315/246
5,637,965  6/1997 Maya et al. ............................. 315/358
5,723,952  3/1998 Matsumoto et al. .................... 315/291

*Primary Examiner*—Don Wong
*Assistant Examiner*—Wilson Lee
*Attorney, Agent, or Firm*—Sixbey, Friedman, Leedom & Ferguson; David S. Safran

[57] ABSTRACT

The invention relates to a device for operating a fluorescent discharge lamp of the outer electrode type. As claimed in the invention a switching device is turned on and off by driver signals with a stipulated frequency, by which on the secondary side of a transformer the periodic voltage waveform shown at A in FIG. 1 is produced. This voltage waveform is applied to the fluorescent discharge lamp of the outer electrode type, and thus operation is effected. For the above described periodic voltage waveform, with respect to repetition period t $2 W_0 < t$, if the width at a voltage of the waveform of 0 V which has a single maximum peak value within one period is labeled $W_0$, its full width at half maximum (the width between a and b in FIG. 1) being set to a stipulated value (for example, to a value of less than or equal to 2.5 $\mu$sec). This makes it possible to maintain stable emission even if the pressure of the gas filled in the discharge lamp is increased. In this way high illumination intensity can be obtained.

17 Claims, 12 Drawing Sheets

DEVICE FOR APPLYING PARTICULAR VOLTAGE WAVEFORM FOR OPERATING A DISCHARGE LAMP

BACKGROUND OF THE INVENTION

1. Field of the Invention

The invention relates to a device for operating a fluorescent discharge lamp of the outer electrode type which is used for document scanning illumination of an information processing device, such as a fax machine, a copier, an image reader and the like, and for a back light device of a liquid crystal display and for similar purposes.

2. Description of the Related Art

A fluorescent discharge lamp of the outer electrode type is known as a fluorescent lamp which is used for document scanning illumination of an office automation device and for back light of a liquid crystal display of an office automation device and the like.

In the above described fluorescent discharge lamp of the outer electrode type, on the outside of a glass tube there is a pair of line-like or strip-like outer electrodes to which an uninterrupted high frequency voltage or a pulse-like high frequency voltage is applied to operate the lamp.

FIG. 12 is a schematic of an arrangement of the above described fluorescent discharge lamp of the outer electrode type. FIG. 12(a) shows a cross section of the fluorescent discharge lamp of the outer electrode type which corresponds to the direction perpendicular to the direction of the tube axis. FIG. 12(b) is a side view hereof.

As becomes apparent from FIG. 12, fluorescent discharge lamp of the outer electrode type 1 consists of discharge vessel 3 which consists of a dielectric such as glass or the like, a pair of strip-like or line-like electrodes 2, 2', and layers of fluorescent material 4 which are formed on the inside of discharge vessel 3. Electrodes 2, 2' are located on the side of discharge vessel 3 in the direction of the tube axis roughly over the entire length and consist of aluminum of the like.

Conventionally, above described fluorescent discharge lamp of the outer electrode type 1 has been operated by applying a high frequency voltage to the outer electrodes as in a cold cathode fluorescent discharge lamp of the inner electrode type. That is, high frequency main circuit 5 as shown in FIG. 13 is connected to the pair of electrodes 2, 2' of fluorescent discharge lamp of the outer electrode type 1. For example, a waveform high frequency AC voltage according to FIG. 14 is applied to electrodes 2, 2'. In this way a high frequency voltage is applied in the discharge space within discharge vessel 3 which is present between outer electrodes 2, 2' via the side discharge vessel 3, forming a discharge.

This approach is disclosed in the patent disclosure document of Japanese patent application HEI 3-225745 (U.S. Pat. No. 5,117,160).

In the above described conventional operation method there is a process with which the illuminance of the fluorescent discharge lamp of the outer electrode type is increased even more. In this process the gas pressure of the rare gas which is filled within discharge vessel 3 is increased.

In the above described case of increasing the filling pressure however the current required for discharge is not sufficient if the voltage applied to the fluorescent discharge lamp of the outer electrode type is not increased. In this case a stable discharge cannot be obtained.

In the following the shape of the discharge within discharge vessel 3 is detailed in the case of increasing the encapsulation pressure:

In this discharge, over the entire region of the lamp a plurality of locations at which emission is concentrated is formed. This plurality of local sites at which the emission is concentrated furthermore changes their positions over time. The emission state in discharge vessel 3 is observed in the form of a strip. FIG. 15 schematically shows this strip-like discharge phenomenon.

Fluorescent discharge lamp of the outer electrode type 1 shown in FIG. 12 can be called a capacitor which consists of outer electrodes 2, 2' and discharge vessel 3 as the dielectric. The lamp current which is supplied to this fluorescent discharge lamp of the outer electrode type 1 is determined by the magnitude of electrostatic capacity which is formed between outer electrodes 2, 2' and discharge vessel 3 which consists of the dielectric. Current must be supplied to increase the illuminance of fluorescent discharge lamp of the outer electrode type 1 even more. This means that the voltage applied to outer electrodes 2, 2' and the high frequency of the voltage must be increased.

When the applied voltage was increased however the disadvantages of the danger of formation of creeping discharge on the surface of the dielectric between outer electrodes 2, 2' and the danger of formation of an insulation breakdown in the circuit arose.

SUMMARY OF THE INVENTION

The invention is devised to eliminate the above described disadvantage. Therefore the object of the invention is to devise a device for operating a fluorescent discharge lamp of the outer electrode type in which even when the pressure of the filled gas is increased in the discharge vessel a stable discharge can be maintained and in which at the same time higher illuminance can be obtained.

In the conventional operation method in which a sine curve is applied the phenomenon shown above in FIG. 15 occurs when the pressure of the rare gas filled discharge vessel 3 and the voltage applied to discharge lamp 1 are increased, as was described above. Therefore a stable discharge cannot be maintained.

As the result of various experiments and tests it has been shown that by operating discharge lamp 1 by applying a periodic voltage waveform with a steep start-up and maximum peak waveform in which the width with respect to repetition period t is less than or equal to a stipulated value, a stable discharge can be maintained even when the pressure of the filled gas increases.

This means that it was found that by applying a periodic voltage waveform to discharge lamp 1 in which full width at half maximum of H lies within a stipulated value, even when the pressure of the filled gas increases, a stable discharge can be maintained and the illuminance can be increased, when for a voltage waveform measured at the two ends of the lamp (voltage between P and Q in FIG. 1) the width between two points a and b is defined as full width at half maximum. The voltage at two points a and b has a value (H/2 in the Figure) which, proceeding from the position in which a waveform with a maximum peak value of the voltage within the above described one period intersects voltage OV has half the maximum peak value (H in the figure) as is illustrated in box A in FIG. 1A.

The object is achieved according to the invention as follows, based on the above described principle:

(1) In a device for operating a fluorescent discharge lamp of the outer electrode type, in which within a glass tube at least one of rare gases He, Ne, Ar, Kr or Xe is/are hermetically sealed in a stipulated amount, in which fluorescent material is applied to the inside of the above described glass tube, and in which in the axial direction of the outside of the above described glass tube there are at least two strip-shaped electrodes, operation of the above described discharge lamp is effected by applying a voltage with a periodic waveform, in which with respect to repetition period t of the voltage waveform 2 Wo<t, if the width at a voltage of the waveform of 0 V which has a single maximum peak value within a period for a periodic waveform of the lamp voltage is labeled Wo.

This makes it possible to maintain a stable discharge even when the pressure of the gas filled in the discharge lamp is increased, and to increase the illuminance more than in the conventional operation method in which the sine curve is applied.

(2) In the above described device for operating a discharge lamp, discharge lamp 1 is operated by applying a voltage with a periodic waveform, in which full width at half maximum of a waveform with a maximum peak value at the operating lamp voltage satisfies condition W<Wx, if with respect to the repetition period t of the voltage waveform 2 Wo<t, if the width at a voltage of the waveform of 0 V which has a single maximum peak value within one period at the periodic waveform of the lamp voltage is labeled Wo, if furthermore the maximum illuminance is labeled L, which in the case of operation of the above described lamp is obtained by a sine curve, if the same lamp wattage as in this case is supplied under the aforementioned conditions, and if the full width at half maximum of a waveform with a maximum peak value at which the above described illuminance L can be obtained is designated Wx.

(3) For (1) and (2) full width at half maximum of the waveform with the maximum peak value is fixed in the range of W≦2.5 μsec.

(4) For (1) and (2) period t of the periodic voltage waveform is fixed in the range from 5 μsec to 70 μsec.

(5) For (1) and (2) a fluorescent discharge lamp of the outer electrode type is operated in which within the glass tube a gas with a partial pressure of the Xe gas of greater than or equal to 80 torr and a total pressure of the filled gas of less than or equal to 760 torr is filled.

(6) For (1) and (2) an oscillation wave which follows the maximum peak voltage is supplied with an effective power which contributes to emission.

(7) For (1) and (2) the periodic waveform of the lamp voltage is produced by a circuit of the flyback type.

In the invention, the arrangement described above in (1) to (7) makes it possible to maintain a stable discharge even when the pressure of the gas filled in the discharge lamp is increased, and to further increase the illuminance more than in the conventional operation method in which the sine curve is applied.

In the following the invention is described using several embodiments shown in the drawings.

Figure 8:
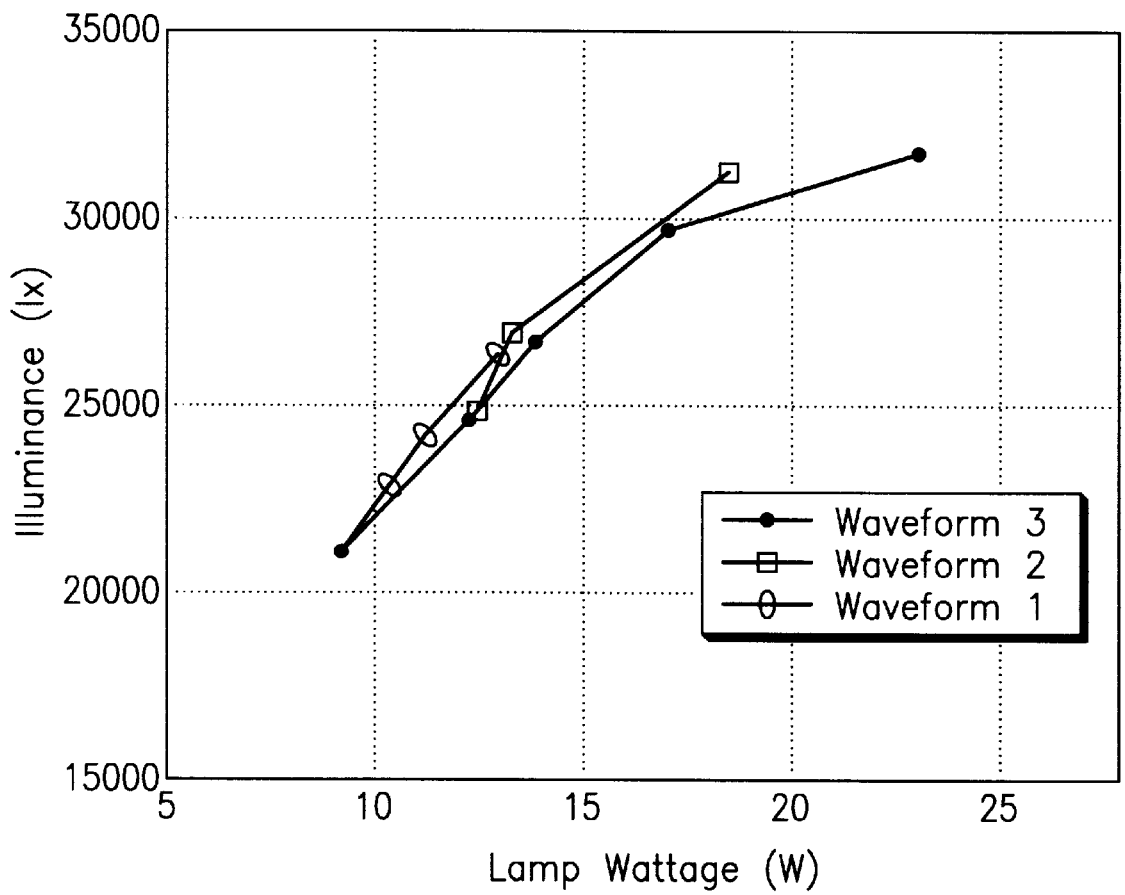
Figure 9:
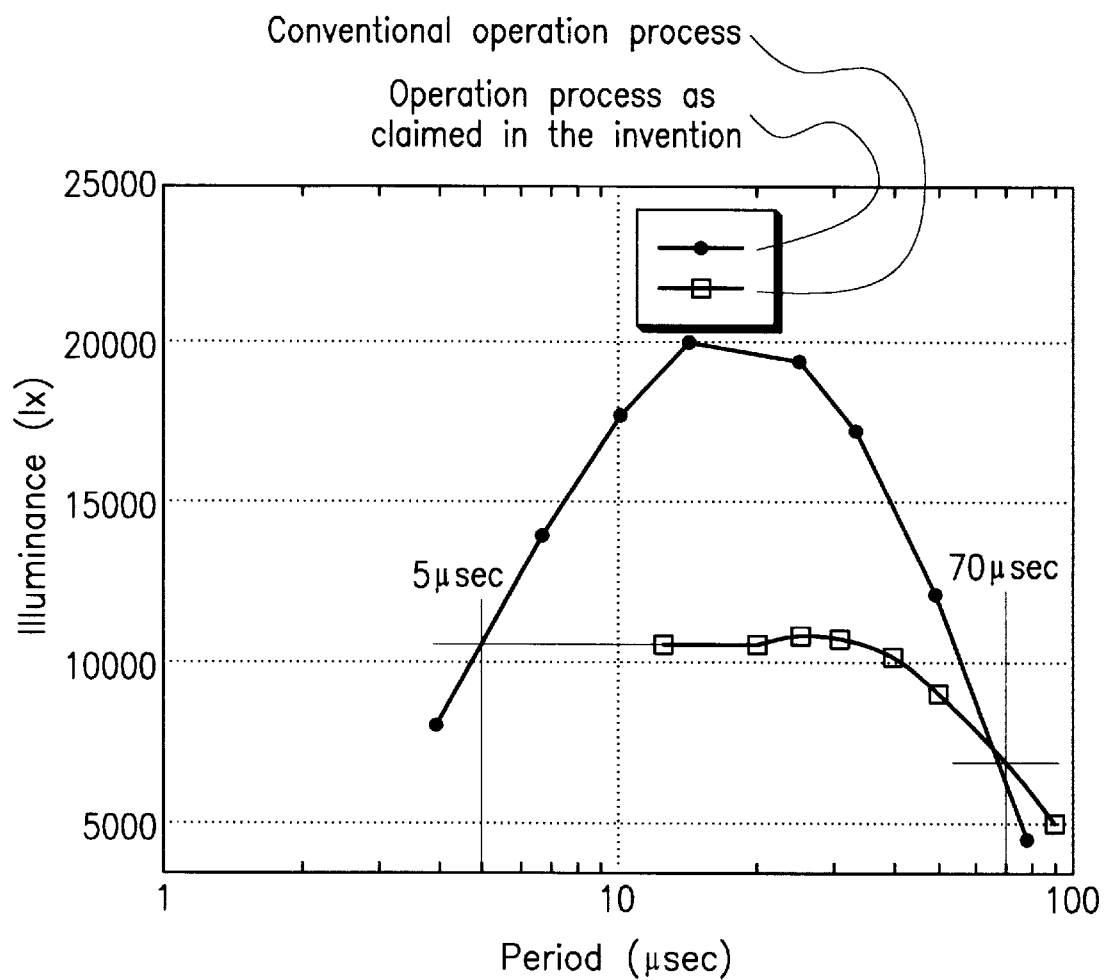
Figure 10:
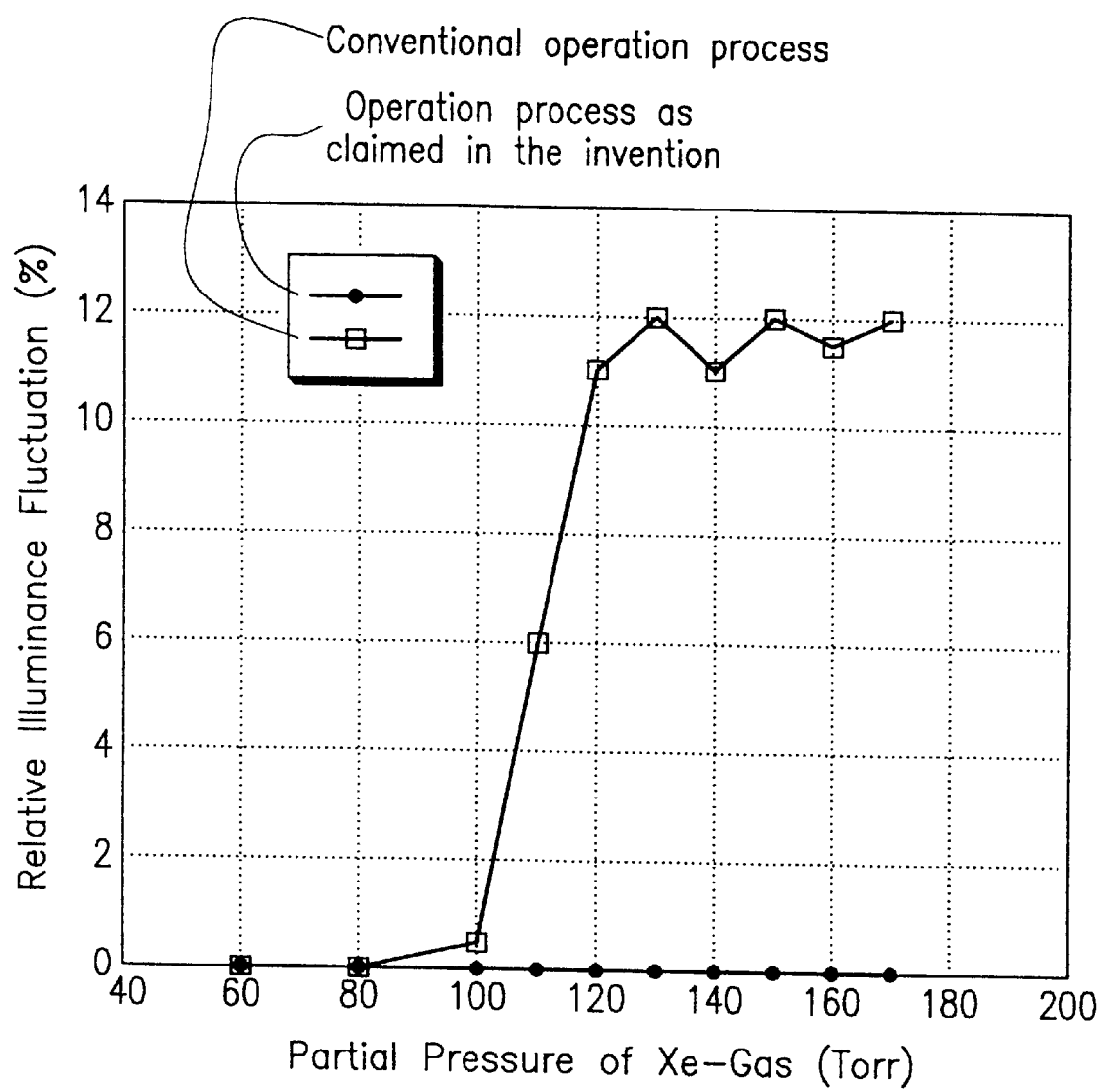
Figure 11:
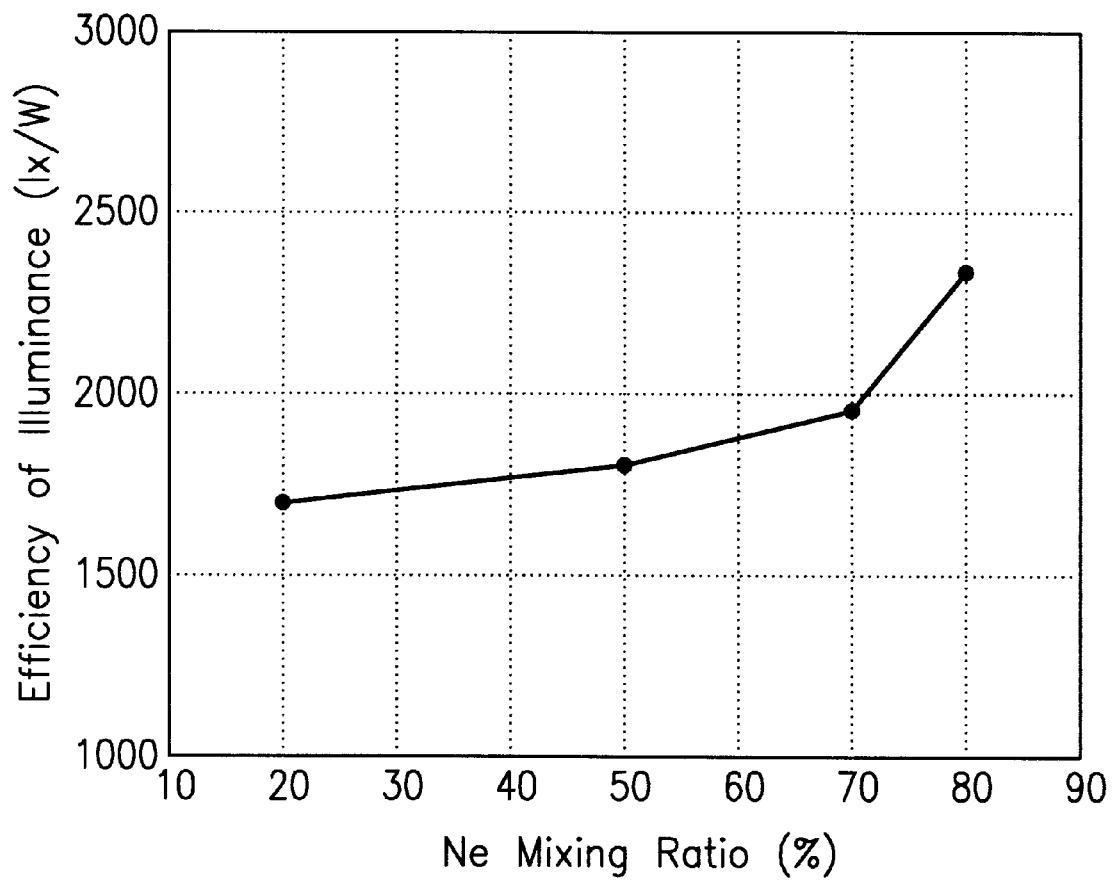
Figure 12A:
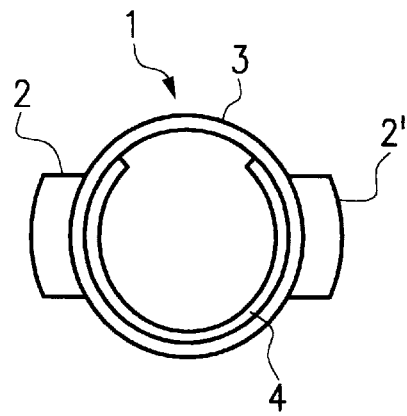
Figure 12B:
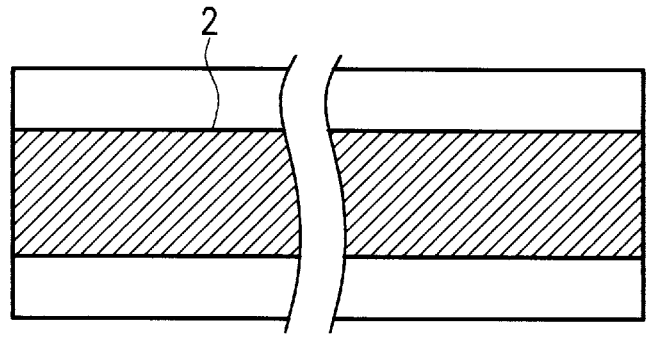
Figure 13:
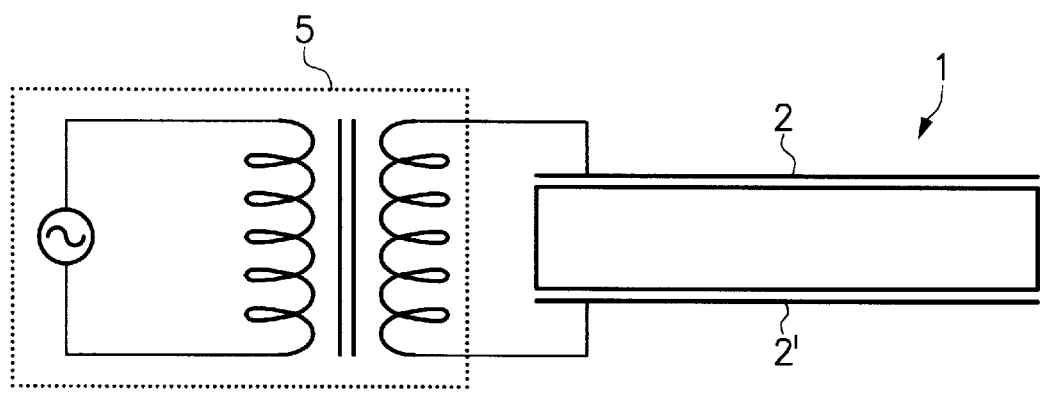
Figure 14:
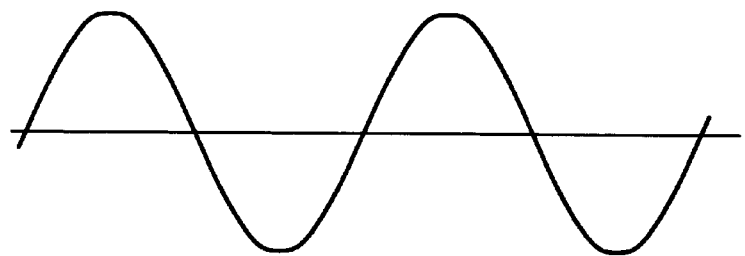
Figure 15:
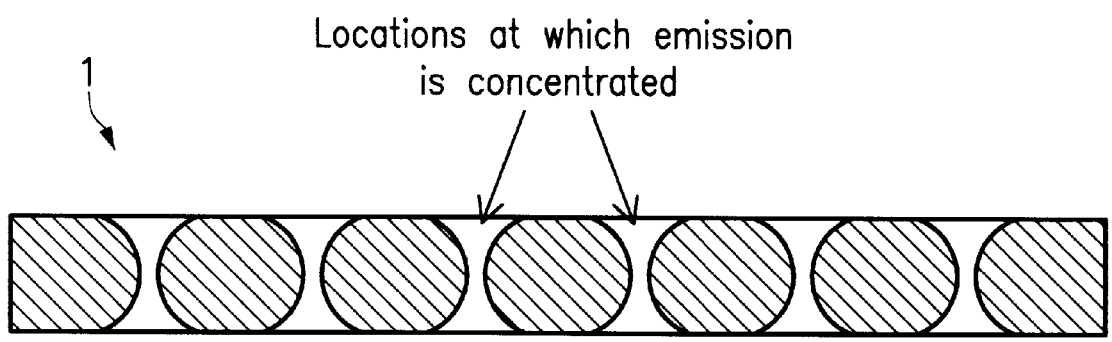

FIG. 7(a) through FIG. 7(d) each show one schematic of the lamp voltage waveform in operation of the discharge lamp;

FIG. 8 shows a schematic of the relation between the lamp wattage and the illuminance with different waveforms;

FIG. 9 shows a schematic of the relation between the operation period and the illuminance;

FIG. 10 shows a schematic of the relation between the partial pressure of the Xe gas and relative luminance fluctuation;

FIG. 11 shows a schematic of the relation between the mixing ratio of Ne and the illuminance;

FIG. 12(a) shows a schematic cross section of one arrangement of a fluorescent discharge lamp of the outer electrode type; and FIG. 12(b) shows a schematic side view of the arrangement according to FIG. 12(a);

FIG. 13 shows a schematic of a circuit of a conventional operation type using a sine curve high frequency of a fluorescent discharge lamp of the outer electrode type;

FIG. 14 shows a schematic of a voltage waveform for operation of a conventional fluorescent discharge lamp of the outer electrode type; and FIG. 15 shows a schematic of a phenomenon of unstable discharge which occurs at a high pressure of the filled gas.

DETAILED DESCRIPTION OF PREFERRED EMBODIMENTS

Figure 1:
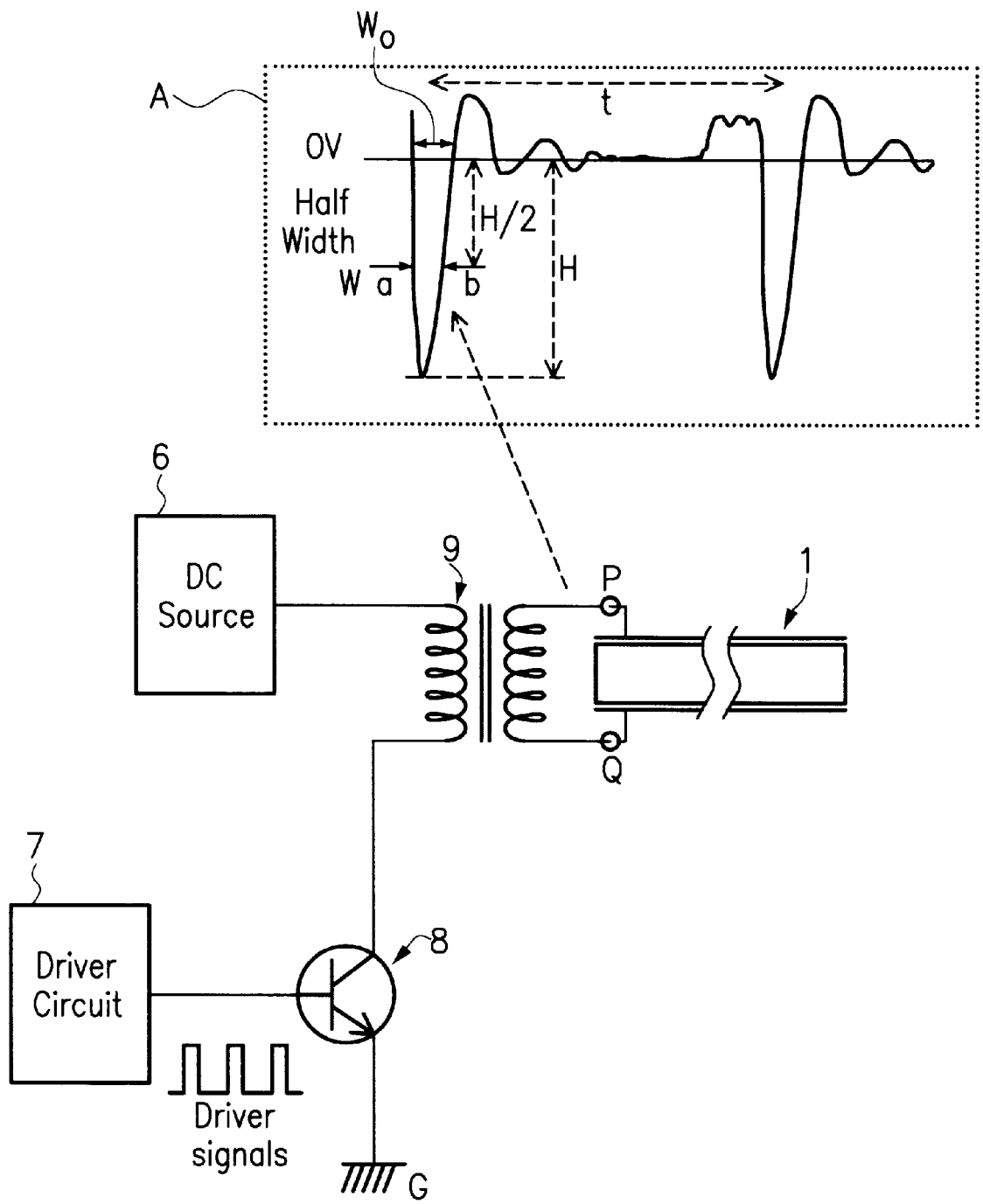
FIG. 1 shows a schematic of one arrangement of a basic circuit of the flyback type of one embodiment of the device as claimed in the invention for operating a discharge lamp.

FIG. 1 is a schematic of an arrangement of a basic circuit of one embodiment of the device as claimed in the invention for operating fluorescent discharge lamp 1 of the outer electrode type (hereinafter called a discharge lamp). Furthermore, reference number 6 labels a DC source, reference number 7 a driver circuit, reference number 8 a switching device, and reference number 9 a transformer. This figure shows the arrangement of a basic circuit of the flyback type. Switching device 8 is turned on and off by driver signals with a stipulated frequency which is delivered by driver circuit 7. If switching device 8 is turned on by the above described driver signals, current flows via a line from DC source 6 via the primary winding of transformer 9, switching device 8 to ground G, and energy is stored in transformer 9.

When switching device 8 is turned off, the current flowing through transformer 9 is turned off. The above described energy stored in transformer 9 is therefore released. On the primary side and secondary side of transformer 9 this yields the voltage waveform shown at A in FIG. 1 with a steep rise. This voltage waveform is attenuated with an attenuation constant which corresponds to the line constant. If switching device 8 is turned on and then turned off, successively a voltage waveform with a steep rise is formed again in the above described manner.

As was described above, each time switching device 8 is turned on/off with a stipulated frequency by the driver signals output by driver circuit 7, the voltage waveform with a steep rise is formed repeatedly on the secondary side of transformer 9, as is illustrated at A in FIG. 1. This voltage waveform is applied to discharge lamp 1.

In the above described device for operating a discharge lamp, as was described above, by fixing full width at half maximum of the above described voltage waveform within a stipulated value and by application thereof with the stipulated repetition period t to discharge lamp 1, a stable discharge can be maintained, even if the pressure of the gas filled in discharge lamp 1 is increased.

One conceivable reason for this is the following: If a voltage with a short starting time, i.e., a voltage which contains a high percentage of high frequencies, is applied to discharge lamp 1, discharge vessel 3 consisting of glass or the like does not in fact act as a dielectric, and thus an approximation to a state is achieved in which a voltage is applied directly to the gas filled inside.

That is, in the discharge lamp which is operated via the glass, the latter is a dielectric. If a voltage is applied to the lamp, this glass surface is therefore electrified and discharge begins if a breakdown voltage is achieved. This discharge immediately neutralizes the glass surface and then stops because there is no longer any potential gradient. When the next discharge begins, the glass surface is neutralized again and the discharge stopped in the same way. This process is repeated. This phenomenon arises depending on the condition of the glass surface and the respective electrification condition in each area of the glass surface.

When the voltage applied to the lamp is a sine curve, the voltage increases relatively gently, and a voltage waveform of this type occurs continually and repeatedly. These phenomena therefore always occur and it is conceivable that apparently a strip-like discharge would occur, as was described above.

In the case of a conventional luminous operation process in which a sine curve is applied, therefore at a partial pressure of the Xe gas of greater than or equal to 80 torr, the above described phenomenon occurs and relative luminance fluctuation is acutely increased if the pressure of the gas encapsulated in the discharge lamp is increased to raise the illumination intensity, as is described below.

If, on the other hand, a voltage waveform with a short rising time is applied to the lamp, a condition is approximated in which the voltage is applied directly to the gas itself filled in discharge vessel 3, as was described above. The above described phenomenon of neutralization of the surface of the dielectric is therefore reduced. It is conceivable that a strip-like discharge would not occur and that a stable emission would be produced.

Here the illumination intensity of the ultraviolet radiation which are emitted from the Xe gas of discharge lamp 1 decreases both at an overly high repetition frequency of the above described voltage applied to discharge lamp 1 (called the "operation frequency"), and also at an overly low operation frequency. The possible reason for this is as follows:

(1) in the case of a reduction of the luminous frequency

If the operation frequency is reduced with a constant input power, the energy per repetition of the lamp voltage waveform increases according to the reduction of the operation frequency. On the other hand, the radiant efficiency of Xe decreases when the input energy is increased. It is therefore conceivable that the lower the operation frequency is made, the more the radiant efficiency and the illuminance decrease.

(2) in the case of an increase of the operaton frequency

Based on the aforementioned explanation (1), the illumination intensity does increase up to a certain frequency when the luminous frequency is increased. But if the frequency is increased even more, the next voltage waveform destroys the excitation species which produce the ultraviolet radiation, thus causing the illuminance to decrease.

The conceivable reason for this is that in conjunction with the life time of the excitation species, still remaining excitation species are destroyed by the energy obtained during the next period and that emission with good radiant efficiency is no longer obtained from the excitation species if the next voltage waveform with an earlier period than the lifetime of the excitation species once produced is applied to the discharge lamp.

As was described above, by fixing full width at half maximum of the voltage applied to discharge lamp 1 within a stipulated value and furthermore by selecting the repetition frequency of the voltage applied to discharge lamp 1 in a suitable range, the discharge lamp is operated in a stable emission condition even if the pressure of the filled gas is increased.

Figure 2:
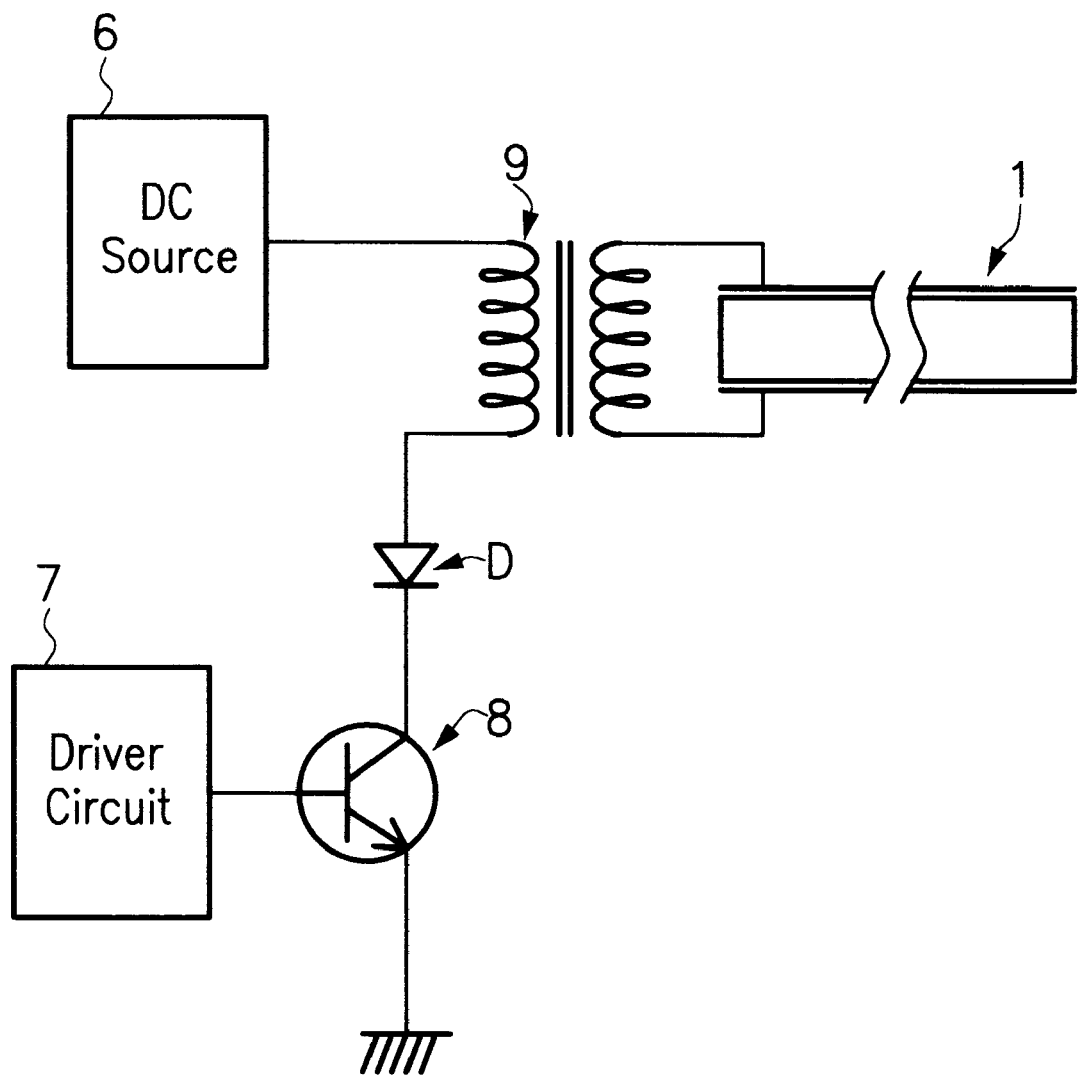
FIG. 2 shows a schematic of an arrangement of a circuit of the flyback type of another embodiment of the operation device as claimed in the invention.
Figure 3:
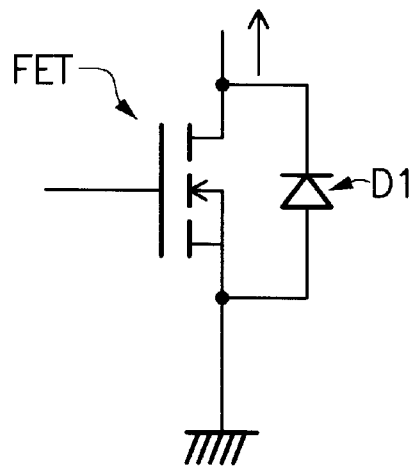
FIG. 3 shows a schematic of a MOSFET circuit intrinsically including one diode.

FIG. 2 is a schematic of an arrangement of a circuit of the flyback type of another embodiment of the operation device as claimed in the invention. In this embodiment diode D is located in series with switching device 8. If for example a MOSFET is used as switching device 8, conventionally with respect to an arrangement between the drain and the source electrode there is diode D1, as is shown in FIG. 3. In the case of the circuit shown in FIG. 2 therefore at the instant the input power is turned off on the primary side of transformer 9 an electromotive counterforce is formed, the current flowing in the direction of arrow in FIG. 3 and the radiant efficiency decreasing to a high degree.

In FIG. 2 therefore diode D is series connected to switching device 8 so that the above described current is hindered. Without a decrease of efficiency, this arrangement yields a voltage waveform with above described full width at half maximum within a stipulated value even if switching device 8 which is shown in FIG. 3 and which is provided with diode D1 is used.

In the following the experimental result during operation of fluorescent discharge lamp of the outer electrode 1 using the above described operation device is shown.

Figure 4:
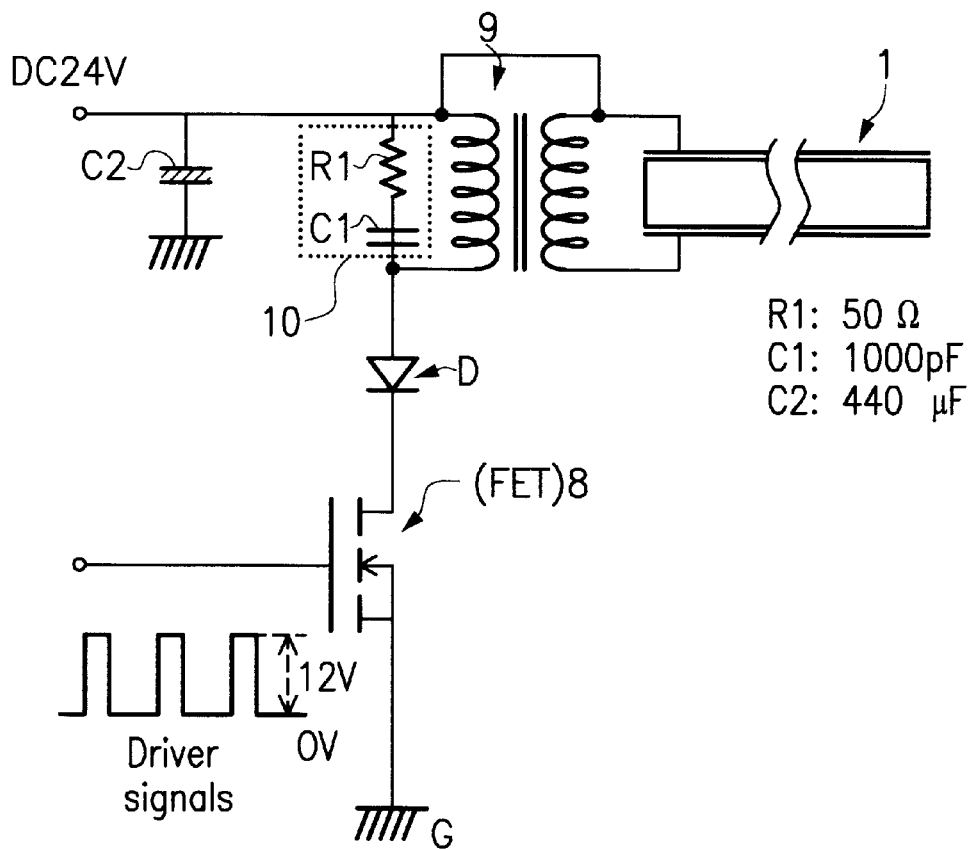
FIG. 4 shows a schematic of one arrangement of an experimental circuit of the flyback type which is used in the invention.

FIG. 4 is a schematic of one arrangement of an experimental circuit of the flyback type which was used in this embodiment. In FIG. 4 a MOSFET was used as switching device 8. Diode D was series connected to switching device 8, as was shown in FIG. 2. On the primary side of transformer 9 snubber circuit 10 is connected; it consists of a series connection of resistor R1 of 50 ohms and capacitor C1 of 1000 pF. Furthermore, a 24 V DC source was connected to one of the terminals on the primary side of transformer 9, while switching device 8 was connected to the other terminal via diode D and was supplied with driver signals with a peak value of 12 V, as is shown in the drawing. Capacitor C2 of 440 $\mu$F was connected to the 24 V DC source. Transformer 9 with following properties (1) to (4) was used, the full width at half maximum of the periodic voltage waveform which is formed on the secondary side of transformer 9 having been changed.

Figure 5:
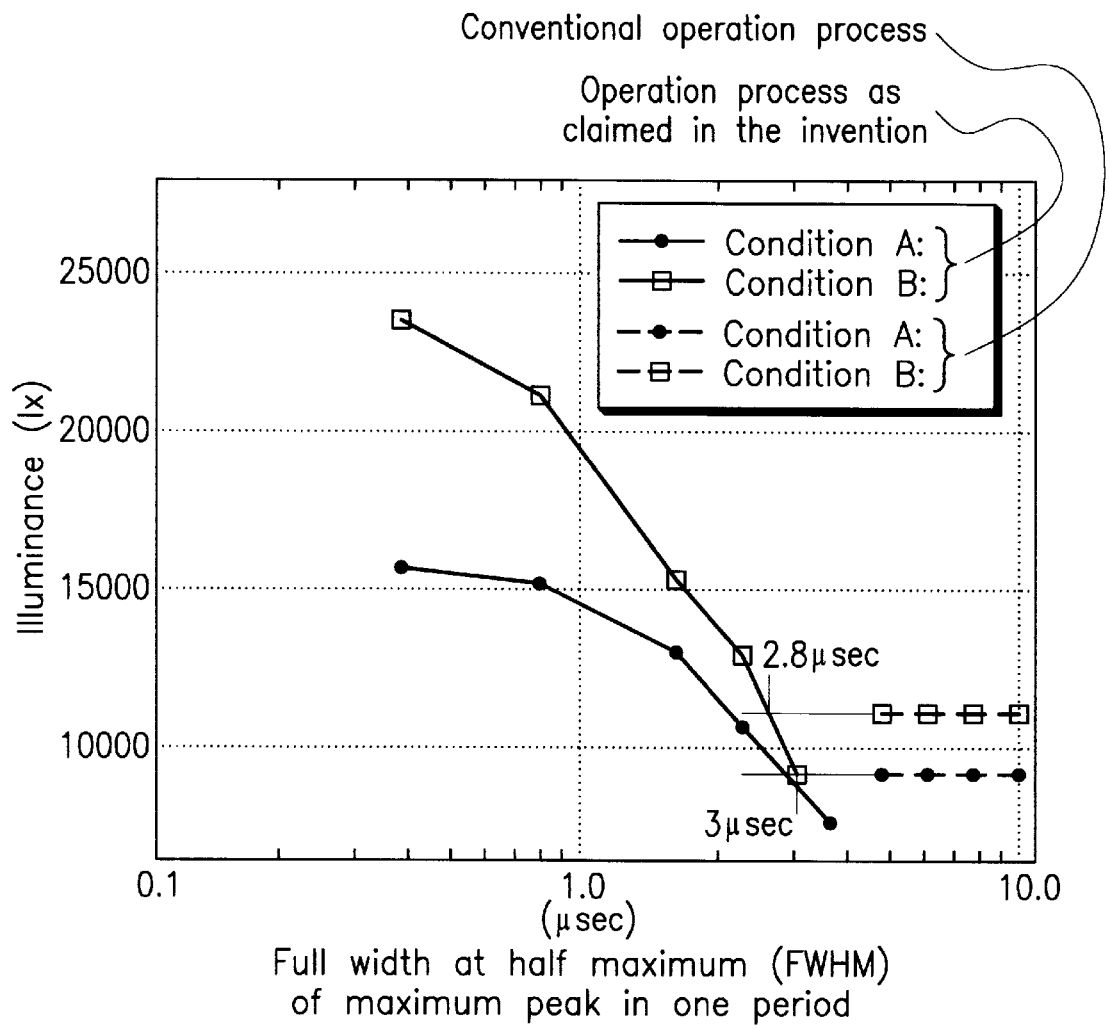
FIG. 5 shows a schematic of the relation between the full width at half maximum and the illuminance of the discharge lamp (with 8 mm diameter)
Figure 6:
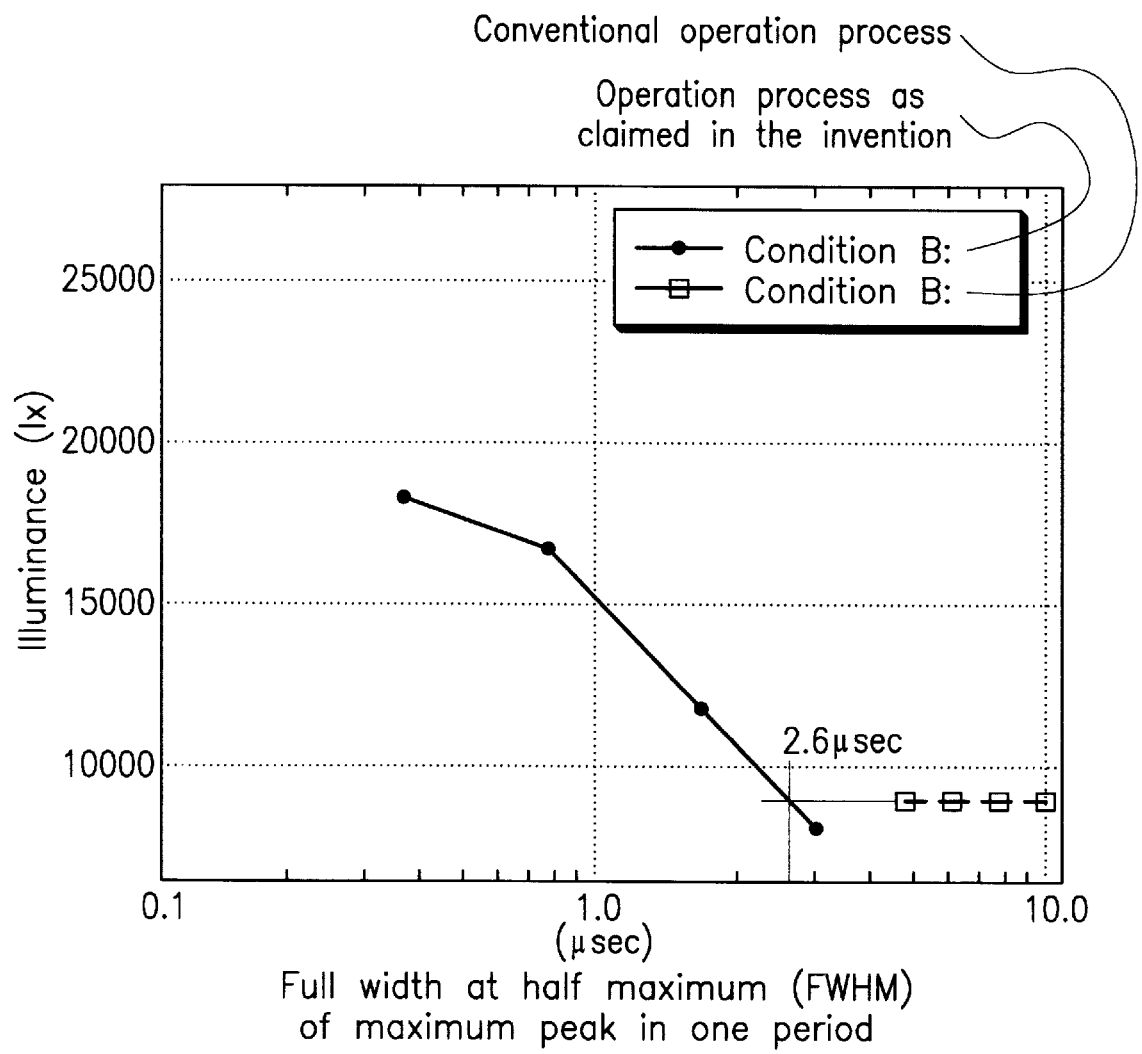
FIG. 6 shows a schematic of the relation between the full width at half maximum and the illuminance of the discharge lamp (with 6.5 mm diameter)

(1) at a full width at half maximum of 0.4 $\mu$s inductance on primary side 8.5 $\mu$H inductance on the secondary side 0.34 mH (2) at a full width at half maximum of 0.8 $\mu$s inductance on primary side 8.5 $\mu$H inductance on the secondary side 1.3 mH (3) at a full width at half maximum of 1.9 $\mu$s inductance on primary side 8.5 $\mu$H inductance on the secondary side 5.4 mH (4) at a full width at half maximum of 3.0 $\mu$s inductance on primary side 8.5 $\mu$H inductance on the secondary side 12.1 mH FIGS. 5 and 6 are schematics of the relation between the full width at half maximum which was obtained in the above described experimental circuit, and the illuminance of the discharge lamp.

In FIG. 5 a lamp with a tube diameter of 8 mm and a lamp length of 360 mm is used as a discharge lamp; it has two strip-like electrodes (one pair) with an electrode width of 8 mm. FIG. 5 shows the relation between the full width at half maximum and the illuminance during operation of the discharge lamp under conditions A and B described below. In FIG. 5 the "operation process as claimed in the invention" represents operation using the circuit shown in FIG. 4, while the "conventional process" represents operation of the discharge lamp with a sine curve high frequency AC voltage.

Condition A: lamp wattage 7 W
Condition B: lamp wattage 13 W

Operation in the operation process as claimed in the invention was accomplished with a operation frequency of 40 kHz under condition A and with a operation frequency of 70 kHz under condition B.

As is apparent from the drawing, in the conventional luminous operation process the illumination intensity under conditions A and B is essentially constant, regardless of the value of the full width at half maximum. In the operation process as claimed in the invention on the other hand the illuminance becomes higher according to a reduction of the full width at half maximum. Here the illuminance at a full width at half maximum of less than 2.8 $\mu$s to 3 $\mu$s becomes higher than in the conventional light operation process.

In FIG. 6 a lamp with a tube diameter of 6.5 mm and a lamp length of 360 mm is used as a discharge lamp; it has two strip-like electrodes (one pair) with an electrode width of 7 mm. FIG. 6 shows the relation between the full width at half maximum and the illuminance during operation of the discharge lamp under the same condition as above described condition B, i.e., with a lamp wattage of 13 W. Here the "operation process as claimed in the invention" represents operation using the circuit shown in FIG. 4, while the "conventional operation process" represents operation of the discharge lamp with a sine curve high frequency AC voltage, as in FIG. 5. Here the operation frequency in the operation process as claimed in the invention was 70 kHz.

In the case shown in FIG. 6 for a full width at half maximum of less than 2.6 $\mu$s the illuminance becomes higher than in the conventional operation process.

From the above described tests it was possible to state that even for changes of operation conditions and of the tube diameter of the discharge lamp the illuminance becomes higher than in the conventional operation process, if at least W<2.5 $\mu$s.

Figure 7:
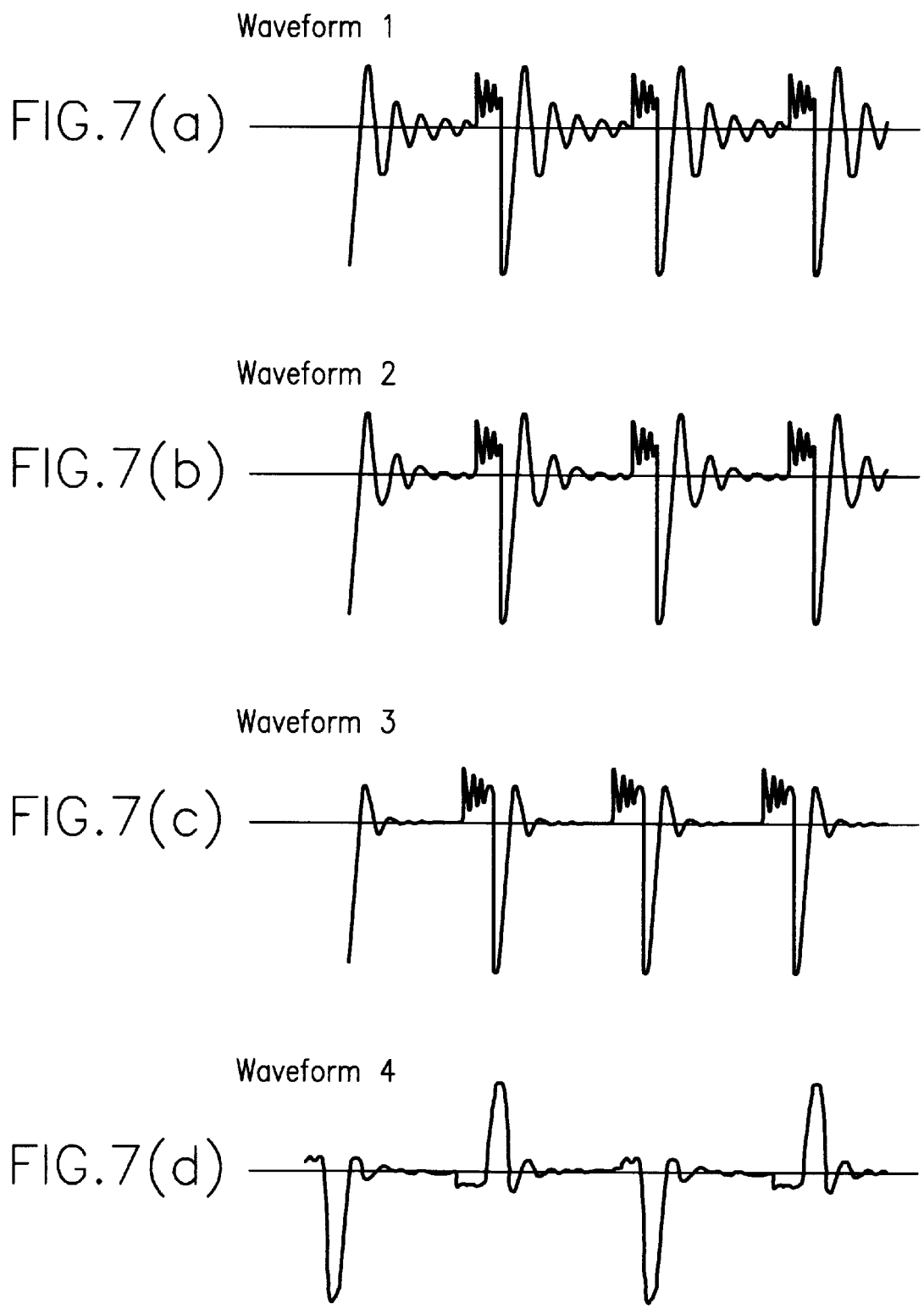

Next, to study the relation between the voltage waveform applied to the discharge lamp and the illuminance, the circuit parameter of the circuit shown in FIG. 4 was changed, voltages with waveforms 1 through 3 shown in FIG. 7(a) through (c) were produced and applied to the discharge lamp, and the relation between the lamp wattage and illuminance studied. In FIG. 7 the oscillation waves which follow on the maximum peak voltages become smaller in the sequence of waveform 1 to waveform 2 to waveform 3.

The lamp wattage for example at a peak voltage of 1400 V was 13.5 W for waveform 1, 12.7 W for waveform 2 and 11.0 W for waveform 3. This corresponds to 1.22 for waveform 1 and 1.14 for waveform 2 if the lamp wattage is designated 1 for waveform 3. These differences of lamp wattage are based on differences of the power which is supplied to the oscillation wave which follows on the maximum peak voltage and which contributes to emission.

If in this way an effective power which contributes to emission can be supplied to the oscillation wave which follows on the maximum peak voltage, it becomes possible to obtain the required amount of light as the peak voltage drops, by which handling, such as insulation, pressure tightness and the like, are simplified in the luminous circuit lamp.

FIG. 8 schematically shows the relation between the lamp wattage and the illuminance if the above described waveforms 1 through 3 have been applied to the discharge lamp. In FIG. 8 a lamp with a tube diameter of 8 mm and a lamp length of 360 mm is used as a discharge lamp, the operation frequency being 70 kHz.

As shown in the drawing, it could be stated that essentially the same illuminance is obtained even if the voltage waveform applied to the discharge lamp does not change.

Furthermore it is conceivable that not only for waveforms 1 through 3, in which the voltage peak value occurs in only one polarity, as is shown in FIG. 7 (a) through (c), but also for voltage waveform 4 is the same effect obtained in which the voltage peak value occurs in two polarities, as is illustrated in FIG. 7 (d). This means that in this way an invention action can be obtained in which the voltage waveform with full width at half maximum of less than or equal to a stipulated value (for example W$\leq$2.5 $\mu$s) is applied with stipulated time intervals to the discharge lamp.

FIG. 9 is a schematic of the relation between the operation period and the illuminance (lamp wattage is constant: 13 W). Here the "operation process as claimed in the invention" represents operation using the circuit shown in FIG. 4, while the "conventional operation process" represents luminous operation of the discharge lamp with a sine curve high frequency AC voltage, as in FIG. 5. Here a discharge lamp with a tube diameter of 8 mm and a lamp length of 360 mm was used.

As is shown in the drawing, the illuminance decreases in the "operation process as claimed in the invention" when the operation period become longer. For a short operation period the illuminance also decreases. The conceivable reason for this is that at a low operation frequency (for a long operation period) the radiant efficiency and illuminance decrease and that for an overly high operation frequency (for a short operation period) emission with good radiant efficiency from the excitation species cannot take place, as was described above.

On the other hand, in the "conventional operation process" up to a luminous period of roughly 30 $\mu$s a constant illuminance is maintained and for longer than roughly 30 $\mu$s the illuminance decreases.

From the above described test it became apparent that in the case of using the "operation process as claimed in the invention" for a luminous period of roughly 5 to 70 $\mu$s a higher illuminance can be obtained than in the "conventional operation process".

Next, the relation between the partial pressure of the Xe gas filled in the discharge lamp and relative luminance fluctuation was examined.

As was described above, when the encapsulation pressure of the discharge lamp increases in the "conventional operation process" the emission state within discharge vessel 3 is observed as a strip, as is illustrated in FIG. 15. Therefore, in the case of using the "operation process as claimed in the invention" and in the case of using the "conventional operation process" the relation between the partial pressure of the Xe gas and relative luminance fluctuation control was examined, the effect of the invention having been confirmed.

Relative luminance fluctuation is defined by maximum brightness "a" of the discharge lamp after n minutes have passed since starting of operation of the discharge lamp (the maximum value of brightness on the locations in FIG. 15 at which emission is concentrated) and by minimum brightness b (the maximum value of brightness at the dark locations in FIG. 15), and it can be computed using the following formula:

$$\text{Relative luminance fluctuation } (\%) = \{(a-b)/(a+b)\} \times 100$$

FIG. 10 is a schematic of the relation between the partial pressure of the Xe gas and the relative luminance fluctuation. Here the "operation process as claimed in the invention" represents operation using the circuit shown in FIG. 4, while the "conventional operation process" represents operation of the discharge lamp with a sine curve, as shown in FIG. 5. Here a discharge lamp with a tube diameter of 8 mm and a lamp length of 360 mm was used which was operated at lamp wattage of 13 W. Three minutes after starting operation relative luminance fluctuation was determined.

As is apparent from the drawing, in the case of the "conventional operation process" relative luminance fluctuation is acutely increased if the partial pressure of the Xe gas is greater than or equal to 100 torr. In the "operation process as claimed in the invention", on the other hand, relative luminance fluctuation does not change even if the partial pressure of the Xe gas is increased. This confirms that at a partial pressure of the Xe gas of greater than or equal to 80 torr in the invention the luminous condition can be kept stable.

As was described above, by using the "operation process as claimed in the invention" the filling pressure of the Xe gas can be set to greater than or equal to 80 torr, at which a stable luminous condition could not be easily maintained in the "conventional operation process" due to high relative luminance fluctuation. As claimed in the invention, this enabled a higher illuminance to be maintained than in the "conventional operation process".

As one of the processes for increasing the illuminance of a discharge lamp there is a process in which a mixed gas based on Xe—Ne is used as the gas filled in the discharge lamp.

FIG. 11 schematically shows the efficiency of the illuminance when the mixing ratio of Ne gas changes, the Xe gas pressure having been 100 torr using the above described basis of gases. In FIG. 11 a discharge lamp with a tube diameter of 8 mm, a lamp length of 360 mm, a frequency of 70 kHz and constant lamp wattage of 20 W was used.

As is shown in the drawing the efficiency of the illuminance increases when the mixing ratio of the Ne gas is increased as the partial pressure of the Xe gas is kept at 100 torr.

As was described above, it is confirmed here that the effect of the invention is obtained in which, when the "operation process as claimed in the invention" is used, even when the partial pressure of the Xe gas is increased, a stable discharge condition can be maintained, as in FIG. 10, even if a mixed gas based on Xe—Ne is used.

If the partial pressure of the Xe gas is 100 torr and the mixing ratio of the Ne gas is 80%, the total pressure within the discharge lamp is 500 torr. If however the total pressure of filling in the discharge lamp is greater than or equal to 760 torr, the difficulty arises that when the discharge lamp is produced the lamp expands, making its manufacture difficult. It is therefore desirable that the total pressure of the gas encapsulated in the discharge lamp be less than or equal to 760 torr.

Commercial Application

As was described above, the device for operating a discharge lamp can be used for document scanning illumination of an information processing device, such as a fax machine, a copier, an image reader and the like, and for a background light device of a liquid crystal display.

It is to be understood that although preferred embodiments of the invention have been described, various other embodiments and variations may occur to those skilled in the art. Any such other embodiments and variations which fall within the scope and spirit of the present invention are intended to be covered by the following claims.

What we claim is:

1. Device for operating a fluorescent discharge lamp of the outer electrode type in which at least one of rare gases He, Ne, Ar, Kr, and Xe is hermetically sealed in within a glass tube and in which a fluorescent material is applied to an inner side of the glass tube, and in which at least two strip-shaped electrodes extend along an outer side of the glass tube in an axial direction thereof, comprising means for applying a lamp voltage to the electrodes which has a periodic voltage waveform with a single maximum peak value within a repetition period that is greater than twice the width of the waveform at a voltage of 0 V, wherein a half-value width W of said single maximum peak value is set to a predetermined value in the range of $10\ \mu s \leq t \leq 30\ \mu s$.

2. Device for operating a discharge lamp according to claim 1, wherein a full width of the waveform at half of the maximum peak value of the operating lamp voltage produced by said means for applying is less than a full width at half of maximum peak value of a waveform with a sine curve at which maximum illuminance is obtained.

3. Device for operating a discharge lamp according to claim 1, wherein a full width at half of the maximum peak value of the waveform is less than or equal to 2.5 $\mu$sec.

4. Device for operating a discharge lamp according to claim 1 or 2, wherein the period of the periodic voltage waveform is in the range of 5 $\mu$sec to 70 $\mu$sec.

5. Device for operating a discharge lamp according to claim 1 or 2, wherein the means for applying a lamp voltage includes means for supplying an oscillation wave which follows the maximum peak voltage and has an effective power which contributes to emission.

6. Device for operating a discharge lamp according to claim 1 or 2, wherein the means for applying a lamp voltage comprises a flyback type circuit.

7. A fluorescent discharge lamp of the outer electrode type in which at least one of rare gases He, Ne, Ar, Kr, and Xe is hermetically sealed in within a glass tube and in which a fluorescent material is applied to an inner side of the glass tube, and in which at least two strip-shaped electrodes extend along an outer side of the glass tube in an axial direction thereof, and having means for applying a lamp voltage to the electrodes which has a periodic voltage waveform with a single maximum peak value within a repetition period that is greater than twice the width of the waveform at a voltage of 0 V, wherein a half-value width W of said single maximum peak value is set to a predetermined value in the range of $10\ \mu s \leq t \leq 30\ \mu s$.

8. Fluorescent discharge lamp according to claim 7, wherein Xe is hermetically sealed in within the glass tube; wherein a partial pressure of the Xe gas is greater than or equal to 80 torr; and wherein a total pressure of the filled gas is less than or equal to 760 torr.

9. Fluorescent discharge lamp according to claim 7, wherein a full width at half of the maximum peak value of the waveform is less than or equal to 2.5 $\mu$sec.

10. Fluorescent discharge lamp according to claim 7, wherein the period of the periodic voltage waveform is in the range of 5 $\mu$sec to 70 $\mu$sec.

11. Fluorescent discharge lamp according to claim 7, wherein the means for applying a lamp voltage includes means for supplying an oscillation wave which follows the maximum peak voltage and has an effective power which contributes to emission.

12. Fluorescent discharge lamp according to claim 7, wherein the means for applying a lamp voltage comprises a flyback type circuit.

13. Method of operating a fluorescent discharge lamp of the outer electrode type in which at least one of rare gases He, Ne, Ar, Kr, and Xe is hermetically sealed in within a glass tube and in which a fluorescent material is applied to an inner side of the glass tube, and in which at least two strip-shaped electrodes extend along an outer side of the glass tube in an axial direction thereof, comprising the step of applying a lamp voltage to the electrodes which has a periodic voltage waveform with a single maximum peak value within a repetition period that is greater than twice the width of the waveform at a voltage of 0 V, wherein a half-value width W of said single maximum peak value is set to a predetermined value in the range of $10\ \mu s \leq t \leq 30\ \mu s$.

14. Method of operating a discharge lamp according to claim 13, wherein a full width of the waveform at half of the maximum peak value of the operating lamp voltage produced during the lamp voltage applying step is less than a full width at half of maximum peak value of a waveform with a sine curve at which maximum illuminance is obtained.

15. Method of operating a discharge lamp according to claim 13, wherein a full width at half of the maximum peak value of the waveform produced during the lamp voltage applying step is less than or equal to 2.5 $\mu$sec.

16. Method of operating a discharge lamp according to claim 13, wherein the period of the periodic voltage waveform produced during the lamp voltage applying step is in the range of 5 $\mu$sec to 70 $\mu$sec.

17. Device for operating a discharge lamp according to claim 13, wherein the lamp voltage applying step includes the step of supplying an oscillation wave which follows the maximum peak voltage and has an effective power which contributes to emission.

* * * * *